United States Patent [19]

Nagashima et al.

[11] 4,236,228
[45] Nov. 25, 1980

[54] MEMORY DEVICE FOR PROCESSING PICTURE IMAGES DATA

[75] Inventors: Takashi Nagashima, Oume; Norio Aihara, Houya, both of Japan

[73] Assignee: Tokyo Shibaura Electric Co., Ltd., Kawasaki, Japan

[21] Appl. No.: 52,951

[22] Filed: Jun. 27, 1979

Related U.S. Application Data

[63] Continuation of Ser. No. 887,336, Mar. 16, 1978.

[30] Foreign Application Priority Data

Mar. 17, 1977 [JP] Japan ............................... 52-2860577

[51] Int. Cl.³ .............................................. G11C 11/42
[52] U.S. Cl. ...................................... 365/114; 365/45; 179/100.1 PS
[58] Field of Search ................................. 365/45, 114; 179/100.1 PS

[56] References Cited

U.S. PATENT DOCUMENTS 4,025,910   5/1977   Walker .................................. 365/114

Primary Examiner—Terrell W. Fears
Attorney, Agent, or Firm—Finnegan, Henderson, Farabow, Garrett & Dunner

[57] ABSTRACT

The memory device for processing picture images data is comprised from a memory bank including a number of memory boards each constituted by a bit plane, and bits constituting a picture element information are located in different memory boards. There are provided a data write circuit for writing the picture element data having any desired bit length in the memory bank starting from any desired bit location of the memory bank, and a read out circuit for reading out the stored picture element information having any desired bit length from any desired bit position of the memory bank.

5 Claims, 7 Drawing Figures

MEMORY DEVICE FOR PROCESSING PICTURE IMAGES DATA

This is a continuation of application Ser. No. 887,336, filed Mar. 16, 1978.

BACKGROUND OF THE INVENTION

This invention relates to picture image processing apparatus for processing picture image information by using an electronic computer and more particularly a memory device for processing picture images wherein picture image informations are converted into digital quantities for writing into and reading out of the memory device.

A prior art picture image processing apparatus for digitally processing picture image information to display a picture image comprises a main memory unit in which picture image information are stored and read out by designating an address from outside, a refresh memory device which temporarily holds the read out picture information as a frame buffer, a shift register for transferring the picture image information stored in the frame buffer of the refresh memory device by utilizing horizontal and vertical synchronizing signals as reference pulses and a display device for displaying the picture image information transferred from the shift register for each picture element.

With such picture image display apparatus as described above, the picture image information are displayed by the display device as a group of a plurality of picture element information. For example, the picture image information for a frame are divided into 512 vertical picture elements and 512 horizontal picture element for display.

Such picture element information are generally represented by a plurality of bits. For example, where the picture element information are to be represented by white and black colors they are represented by 4 bits according to the screen brightness and tone of the picture. Where the picture image information are to be displayed by color, 8 bits are used for red, blue and green colors respectively for display, thus using a total of 24 bits. For this reason, usually the main memory unit corresponds to the number of picture elements which comprise the picture area of the display device. For example, where a picture area is constituted by a number of picture elements of 512 (vertical)×512 (horizontal), the memory board is also constituted by bits of 512 (vertical)×512 (horizontal). Generally, the memory board is constituted by a bit plane. Consequently, where one picture element information is constituted by four bits, it is necessary to use at least four memory boards whereas when it is constituted by 24 bits, it is necessary to use 24 memory boards.

The main memory unit made up of such memory boards has been designed to correspond to the number of picture elements of a picture area without any flexibility of the memory capacity. Actually, however, it is necessary to display various picture images by the same display device. Thus, picture image information other than 512×512 picture elements are necessary for different applications.

For example, there are picture image information constituted by picture elements of 256×256 or 1,024×1,024. In this case, however, with a fixed memory unit having 512×512 picture elements, it is impossible to display a picture image information constituted by 1,024×1,024 picture elements. Furthermore, even though the memory unit has a capacity of two picture areas it can store the picture image information of only one picture area where the picture image information comprises 256×256 picture elements. Such inconvenience is caused by the fact that the bit allocation cannot be done for the memory area of each memory boards bit by bit.

In a display device in which a picture image is displayed by using 525 scanning lines and at a rate of 60 frames per second, one picture is displayed in 1/30 second. Accordingly, in a color picture one picture element is scanned and displayed in 80 to 90 nano-/seconds.

According to a prior art picture image processing device, there is a substantial difference between the time at which a picture image information is written into the refresh memory unit from the main memory unit and the time at which a picture element is displayed by the display device. Thus, the time for displaying one picture element on the display device is much shorter than the time of reading out a picture image information from the main memory unit. This is caused not only by the difference in the inherent access time of individual apparatus but also by the fact that the picture element information cannot be allocated into the memory unit in a optimum bit length but instead the information actually is allocated with a redundancy, e.g. a considerably surplus bits are assigned. For example, in a byte machine 8 bits are assigned to represent a 4 bit picture element information.

Among presently available picture image processing apparatus may be mentioned an apparatus in which a plurality of display devices and high speed picture image input/output devices are connected in parallel with the picture image processing apparatus and in which there is provided a picture image processing memory device capable of accessing at high speeds to separately filed picture image information, for example, Graphic Display System Modes RM-9100, 9200 and 9300 of Ramtek Corporation.

The picture image processing memory device of the picture image processing apparatus described above has a board construction. The memory device has 8 memory boards and each memory board having a memory capacity corresponding to 262,144 picture elements (512 vertical elements×512 horizontal elements). This picture image processing memory device is used as two refresh memory devices, an input buffer device, and an output buffer device.

In each of the prior art apparatus described above, the picture image information to be displayed on the display apparatus directly corresponds with a memory device for storing the picture image information for the size of the picture image and the quality thereof.

More particularly, where a picture area of a picture image display device comprises 512×512 picture elements, the picture image processing memory device comprises 4 memory boards each containing 512×512 bits in the vertical and horizontal directions where the tone levels of the picture element are constituted by 4 bits. Since this construction is determined at the initial stage of design of the picture image display device, when it is desired to connect a different type picture image display device, for example, containing 1,024×1,024 picture elements in one picture area, it is necessary to prepare different memory board corresponding thereto. In other words, the memory size of the memory board is fixed and lacks expandability and flexibility so that such memory board can not store the picture image information described above.

SUMMARY OF THE INVENTION

Accordingly, it is an object of this invention to provide a novel picture image processing memory device capable of assigning a predetermined bit length at any desired bit position corresponding to such characteristics of the picture as the number of the picture elements of the picture area, and the brightness and the tone of the screen for writing and reading the picture element information.

According to this invention, this object can be accomplished by providing a memory device for processing a picture image comprising a memory bank including a plurality of memory boards each constituted by a bit plane, the memory bank being adapted to store picture element information; a data write circuit for enabling to write the picture element information into the memory bank with any desired bit length starting from any bit position of the memory bank in accordance with the member of bits which constitute the picture image information; and a data read out circuit for enabling to read out the picture element information from the memory device over any bit length starting from any bit position of the memory bank.

With this construction it is possible to display a picture image even when the number of picture elements thereof varies. Moreover, since it is possible to select any desired bit length of the picture element information in accordance with the brightness and tone of screen it is possible to improve the clearness and quality of the reproduced picture. Writing and reading out of the picture element information into and out of the memory device can be done with minimum time since the picture element information had no redundancy i.e. no surplus bits appended to the picture element information bits.

DETAILED DESCRIPTION OF THE PREFERRED EMBODIMENT

Figure 1:
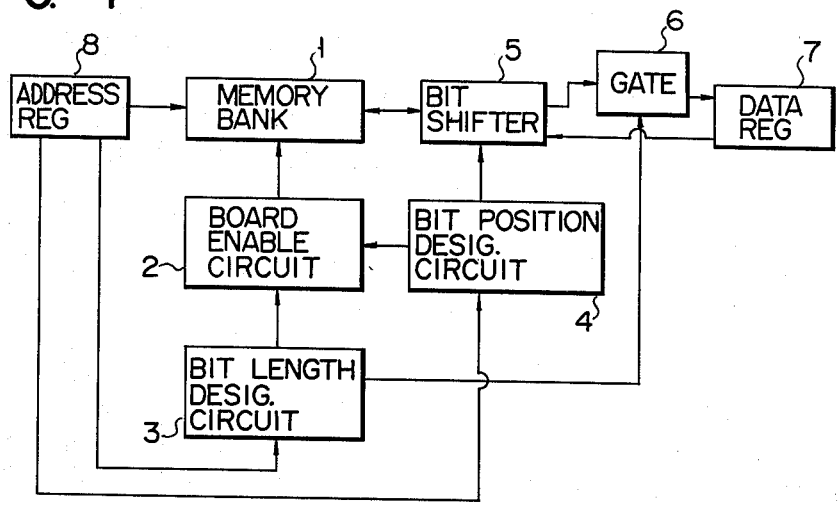
FIG. 1 is a block diagram showing a circuit for writing and reading out picture image information of a picture image processing memory device embodying the invention.

The picture image processing memory device shown in FIG. 1 comprises a data register 7 which is connected to the picture image information input/output device, and to a bit shifter 5 and a gate circuit 6. The bit shifter 5 is connected to a memory bank 1 and a bit position designation circuit 4 which in turn is connected to a board enable circuit 2 and to an address register 8. The board enable circuit 2 is connected to the memory bank 1 and to the bit length designation circuit 3 which in turn is connected to the address register 8. The address register 8 is connected to the memory bank 1.

The data register 7 is provided for the purpose of saving the data received from the input/output device and the output of the gate circuit 6 and constituted by a general register. The purpose of the bit shifter 5 is to shift the output signal of the data register 7, that is, bit information by a designated amount and constituted by a selector which may be of the type 9312 manufactured by Fairchild Semiconductor Inc., for example. The memory bank 1 is made up of a plurality of memory boards and utilized to store the output of the bit shifter 5, that is the bit information. The memory bank 1 is constituted by integrated circuit memory devices.

The purpose of the board enable circuit 2 is to select the memory boards comprising the memory bank 1, and constituted by a decoder, and the bit position designation circuit 4 generates a select signal which is utilized by the board enable circuit 2 to select the memory board. Thus the bit position designation circuit generates an output signal for determining a first memory board, or LSB (Least Significant Bit), and constituted by a selector circuit. The bit length designation circuit 3 applies a signal to the board enable circuit 2 representing the number of the memory boards, or the bit length.

In this manner, the board enable circuit 2 is supplied with the outputs of the bit position designation circuit 4 and the bit length designation circuit 3 to produce a memory board selection signal. Thus, the bits corresponding to the memory boards to be selected become logical state "1".

The address register 8 comprises X and Y registers for storing X and Y address information for determining a bit location for a memory board selected by the board enable circuit 2, and a register that stores information concerning the bit position designation circuit 4 and the bit length designation circuit 3. The gate circuit 6 produces the data with the bit length designated by the bit length designation circuit 3 when a desired data is read out from the memory bank 1.

Figure 2:
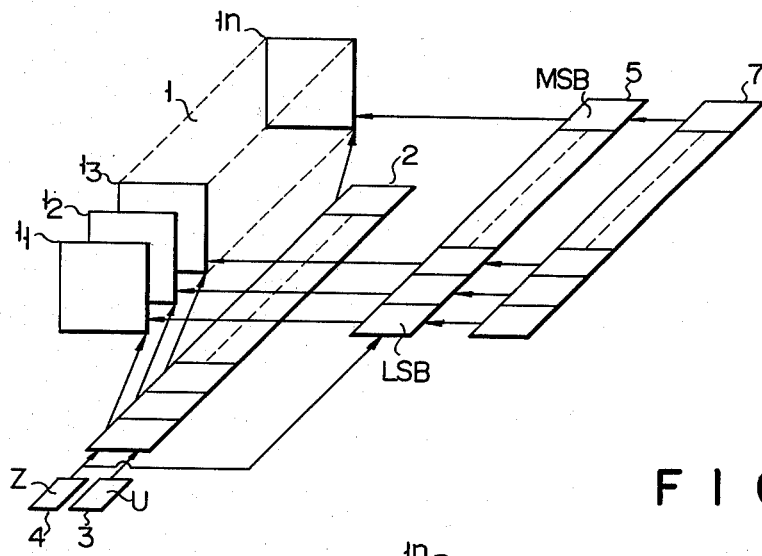
FIG. 2 is a block diagram showing the circuit for writing the picture image information of the picture image processing memory device shown in FIG. 1.

The circuit for writing data into the memory bank 1 will now be described in detail. As shown in FIG. 2 this write circuit comprises the memory bank 1, the board enable circuit 2, the bit position designation circuit 4, the bit length designation circuit 3, the bit shifter 5 and the data register 7.

An N bit picture element information comprising the picture image information as applied by the input/output device to be saved by the data register 7 and the information thus saved is then transferred to the bit shifter 5. The content of this bit shifter 5 is shifted to the right from the left, that is toward the most significant bit (MSB) by a control signal provided by the bit length designation circuit 3 for the purpose of writing the bit information in a predetermined memory boards ($1_1, 1_2, \ldots 1_n$) of the memory bank 1. Thus, the shifted picture element information would be stored in memory boards which are selected in a predetermined number of boards and from the desired board of the memory bank 1 designated by the board enable circuit 2.

Figure 3:
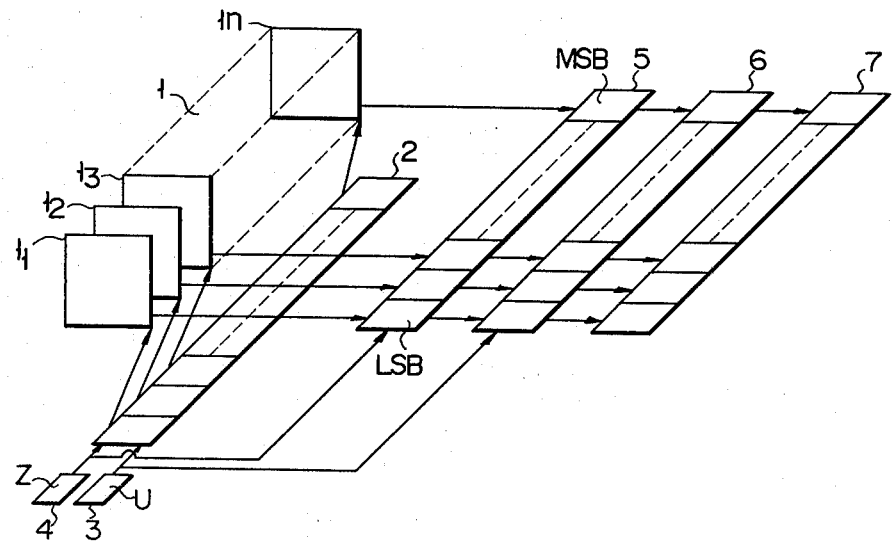
FIG. 3 is a block diagram showing the circuit for reading the picture image information of the picture image processing memory device shown in FIG. 1.

The circuit for reading out the data from the memory bank 1 will now be described in detail. As shown in FIG. 3, this read out circuit comprises the memory bank 1, the board enable circuit 2, the bit position designation circuit 4, the bit length designation circuit 3, the bit shifter 5, the gate circuit 6, and the data register 7.

In this read out circuit, the information from the bit position designation circuit 4 and the bit length designation circuit 3 are applied to the board enable circuit 2 which in response to these information selects one or more of the memory boards ($1_1, 1_2, \ldots 1_n$) of the memory bank 1. Then, a predetermined picture element information is transferred into the bit shifter 5 by the X and Y information from the address register 8, and the content of the bit shifter 5 is shifted to the left from the right, that is toward the least significant bit (LSB) by the bit length designated by the bit length designation circuit 3. The picture element information thus shifted is supplied to the gate circuit 6 which also receives a bit length information that is a control signal from the bit length designation circuit 3 for selecting only the bits corresponding to the bit length information. As a consequence, the gate circuit 6 applies a desired picture element information to the data register 7.

Figure 4:
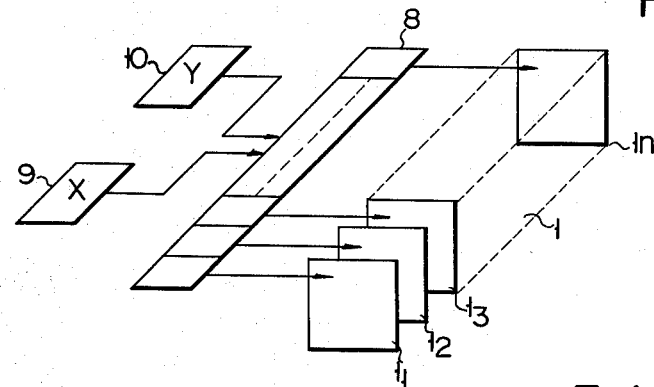
FIG. 4 is a block diagram showing the address designation circuit of an address board.

The address designation circuit will now be described. As shown in FIG. 4 this circuit comprises an X address register 9 and Y address register 10 which designates the X and Y addresses of respective memory boards $1_1, 1_2, \ldots 1_n$, and an address register 8 which is supplied with the outputs of the X and Y address registers 9 and 10 for designating the address of the memory boards. The address information applied to the X and Y address registers 9 and 10 is supplied by the picture image input/output device.

The information designated for each picture element unit comprising the picture image information will now be described.

Figure 5:
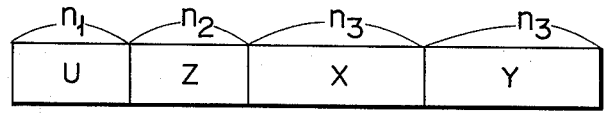
FIG. 5 is a graph showing the picture image information supplied to the picture image processing memory device.

As shown in FIG. 5, the picture element information, a U information ($n_1$ bits) for designating the bit length, a Z information ($n_2$ bits) for designating the bit position, an X information ($n_3$ bits) and a Y information ($n_3$ bits) which are used to designate the address of respective memory boards.

The U information comprises a plurality of bits for representing the number of the memory boards, that is the bit length, said bits determining the level (brightness and tone) of the picture.

The Z information is used to designate the first one of the memory boards and to construct a blocked memory in the memory bank 1 depending upon the size and tone and brightness of the picture. Where the picture image information can not be made to correspond to the memory board owing to the difference in size, the image information is divided so as to meet the size of the memory board and the capacity of the blocked memory and the information of the bit length and the bit position for the divided information are represented by the U and Z information.

The X and Y information each consisting of $n_3$ bits are used to designate the address in the memory boards $1_1, 1_2, \ldots 1_n$ and these information are applied to the address designation circuit.

The number of the $n_1$ bits comprising the U information and the number of the $n_2$ bits comprising the Z information differ depending upon the brightness and tone of the picture. Also the number of $n_3$ bits comprising the address information differs depending upon the memory capacity of the memory boards comprising the memory bank.

The picture image processing memory device is written with information in the following manner. Assume now that the memory bank 1 comprises 16 memory boards and that each memory board comprises 256 (bits)×256 (bits). In this case, there are 16 different memory bit information ranging from one bit, that is one memory board to 16 bits that is 16 memory boards and the bit position and the bit length information ranges from the first to 16th memory board. For this reason, both the bit length information and the bit position information can be represented by 4 bits. For example, a bit length information 0000 means one bit or one memory board and a bit length information 1111 means 16 bits or 16 memory boards. When the bit position information is 0000, the first memory board $1_1$ is selected whereas when the bit position information is 1111 the 16th memory board $1_{16}$ is selected.

Each of the X and Y address information represents each bit location of 256×256=65,536 picture elements and can be expressed by 8 bits.

Suppose now that, in a picture image information A, the picture has a size of 256×256 picture elements in the X and Y directions, that the picture level (brightness and tone) comprises 4 bits and that the picture element information is expressed by $a(i,j)$ ($i=0\sim255$, $j=0\sim255$). Furthermore, in a picture image information B, it is supposed that, a picture has a size of 512×512 picture elements in the X and Y directions, that the picture level comprises 4 bits and that the picture image information is expressed by $b(i,j)$ ($i=0\sim511$, $j=0\sim511$).

Figure 6:
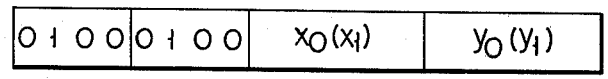
FIG. 6 is a graph showing one example of the bit length information, the bit position designation information and the address information.
Figure 7:
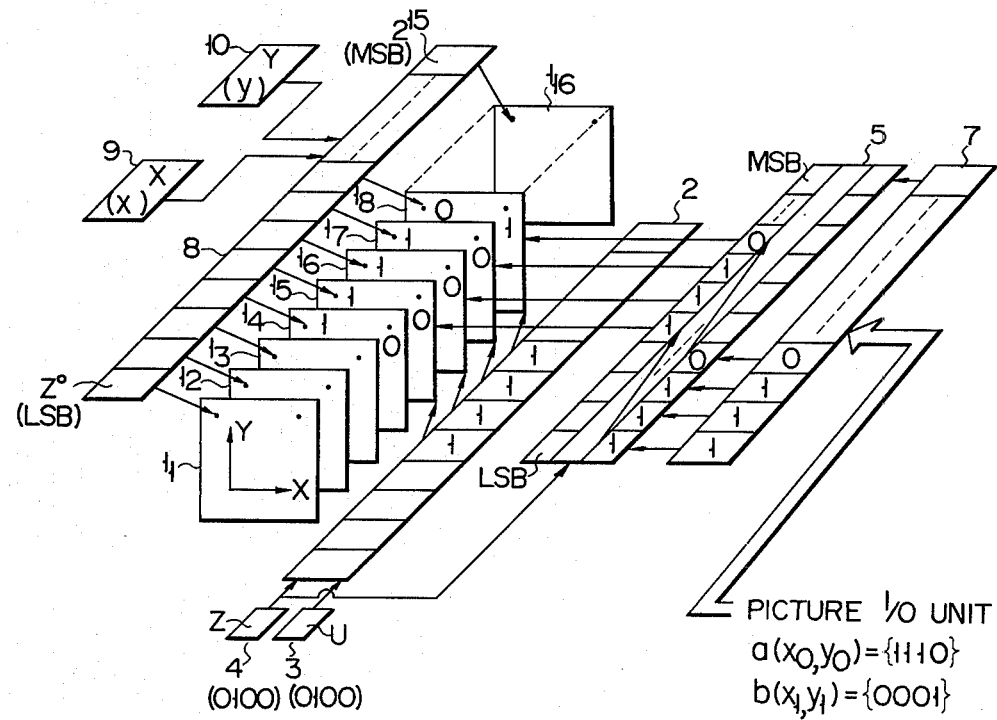
FIG. 7 is a block diagram useful to explain the writing operation of the picture element information in accordance with the information shown in FIG. 6.

Let us denote the picture element information at an address position ($i=x_0$, $j=y_0$) by 1110. This picture element information is supplied to the data register 7 from the picture input/output device, as shown in FIG. 7 to be temporarily stored in the data register 7. Then, the information is transferred to the bit shifter 5. Wherein, the board selection and the address selection of the memory boards are executed according to the address format shown in FIG. 6.

Denoting the U information by 0100 and the Z information by 0100, these information are supplied to the bit length designation circuit 3 and the bit position designation circuit 4, respectively, and the address information $x_0$ and $y_0$ are applied to the address register 8. As a consequence, the bit shifter 5 shifts, by four bits, the picture image information to the right, that is toward MSB.

The board enable circuit 2, acts to select the memory board $1_5$ of the plurality of memory boards $1_1, 1_2, \ldots 1_{16}$ in accordance with the Z information and to designate succeeding four memory boards (including the memory board $1_5$) in response to the U information. Whereby the memory boards $1_5, 1_6, 1_7$ and $1_8$ are selected. Consequently, the picture element information in the bit shifter 5 is written into $a(x,y)$ address designated by the address register 8.

The picture element information $b(x_1,y_1)$ is written as follows. Let us denote a picture element information written in an address position $i=x_1$ and $j=y_1$ by 0001. Since the picture image information B does not correspond to the memory capacity of the memory boards $1_1, 1_2, \ldots 1_{16}$, it is necessary to form the memory bank as a block. More particularly, the vertical and horizontal sizes of the picture image information B for one picture are twice of those of the picture image information A. Consequently, in order to obtain one picture image information it is necessary to use memory boards of the number of 4 times. In this case, the picture area is divided into four sections so as to make each ¼ section to correspond to four memory boards. In other words, the memory bank is constituted by four blocks.

The picture element information b(i,j)=0001 is applied to the data register 7 from the picture image input/output device and then transferred to the bit shifter 5. The bit length designation information (0100), the bit position designation information (0100) and the X,Y address information ($x_1,y_1$) are given and written in the same manner as the picture element information a(i,j). In this manner, the memory boards can store picture images of four sections for the picture information A and a picture image of one picture section for the picture image information B.

The picture image information of the picture image processing memory device are read out in the following manner.

More particularly, to read the picture element information a(x,y)={1110} which has been written in an address (x,y) of the memory bank 1, 0100 is designated as the U information, that is the bit length information and 0100 is designated as the Z information, that is the bit position information. Furthermore, addresses x and y which are storing the picture element information a(x,y)=1110 are respectively designated for X and Y registers. These information are supplied by the picture image input/output device. The bit length designation information is supplied to the bit length designation circuit 3, while the bit position designation information is supplied to the bit position designation circuit 4. Address information x and y are set in the X and Y address registers respectively, and the bits of the addresses x and y of respective memory boards $1_1, 1_2, \ldots 1_{16}$ are read out and transferred into the bit shifter 5, the content thereof being shifted from the right to the left, that is towards the least significant bit in accordance with an information given by the bit position designation circuit 4. The bits as a data shifted by the bit shifter 5 is then applied to the gate circuit 6. The bit circuit 6 is also applied with a bit length information from the bit length designation circuit 3 to apply to the data register 7 only the designated number of the bits. Thus, a desired picture element information a(x,y)=1110 is sent to the picture image input/output device.

In the picture image processing memory device of this invention, since beside the X and Y address information the bit position information and bit length information control the memory boards $1_1, 1_2, \ldots 1_n$ which comprise the memory bank 1, it is possible to flexibly assign the memory in accordance with the variation in the number of the picture elements of the picture image and the variation in the level (brightness and tone) of the picture.

Furthermore, as it is possible to assign the memory without any redundancy to store in it or read out from it the picture elements information, the picture elements information comprise a bit in accordance with the variation in the number of bits that constitute a picture element information. It is possible to increase the speed of writing and reading data into and out of the memory, i.e. the access time of the memory, so that the unbalance between the time of reading out the picture element information from the display device and the time of writing the read out information in the memory bank, and the unbalance between the time of reading out the picture element information from the memory bank and the time of writing the information in the display device.

Although in the foregoing embodiment, the board enable circuit 2, the bit length designation circuit 3, and the bit position designation circuit 4 are constructed as independent units these circuits can be integrated on a chip of a read only memory device so as to minimize the construction and facilitate the writing, thus decreasing the cost. As the read only memory device may be used, for example, type MM 630 manufactured by Monolithic Memory Incorporation.

Although in the embodiment described above, each memory board was constructed to contain 256 (picture elements)×256 (picture elements)×1 (bit), it should be understood that the construction of the memory board is not limited to this particular construction and that its construction may be varied in accordance with the number of picture elements of a picture image.

It should also be understood that the number of the memory boards of the memory bank is not limited to 16, and that the memory boards which are subsequently selected after one memory board selected by the bit position designation circuit are not required to be selected continuously but may be designated in any way so long as a desired number of bits is selected. Accordingly, the bit numbers of the X address information, the Y address information and of the bit length information are not limited to any specific number and may be set to any number depending upon the capacity and the number of the memory boards.

The memory device of this invention is not limited to a picture image processing apparatus but may be used in any application where the quantity of information to be stored in the memory device and the bit length of the information vary.

What we claim is:

1. A memory device for processing a picture image which includes a memory bank having a plurality of memory boards each representing a mutually exclusive bit plane identified by an x and y address in which a bit representing picture element information can be stored; a board enable circuit connected to select a specific memory board for processing picture element information; a bit position designating circuit for generating a select signal including control information and being connected to said board enable circuit which receives said select signal in order to select a first said memory board for processing said picture information; a bit length designating circuit for generating a signal including control information representing a predetermined number of said memory boards to be selected in sequence and being connected to said board enable circuit which receives said sequential signal in order to select said memory boards for processing said picture information; and an address register comprising X and Y registers for storing X and Y address information for determining bit location of said predetermined number of memory boards selected by said board enable circuit and a register that stores said control information utilized by said bit position designation circuit and said bit length designation circuit.

2. A memory device according to claim 1 in which said picture information is written into said memory bank by a means including a data register which stores said picture information to be written into said memory bank; and a bit shifter connected to said data register to shift said picture information from said data register to said predetermined memory boards selected by said enable board circuit so that said picture information which is shifted from said data register is written into said predetermined memory boards identified by particular X and Y addresses provided from said address register.

3. A memory device according to claim 1 in which said picture information is read out from said memory bank by means including a bit shifter which receives said picture information transferred from said board enable circuit and shifts said picture information in accordance with said length designation signal generated by said bit length circuit; a gate circuit which is connected to said bit shifter to receive said picture information, including said length designation information, from said bit shifter; and a data register connected to receive said picture information from said gate circuit.

4. A memory device for processing a picture image which includes a memory bank having a plurality of memory planes and in which each of bits representing picture element information can be stored in a mutually different memory plane;
an address register, bit position designating circuit and bit length designating circuit which are constructed by registers and store control information therein, said control information permitting the picture element information to be read from, or written into, X and Y address positions of initial and subsequent address memory planes of the bank, in which said control information consists of the same X and Y address position information for each memory plane which are supplied from the address register, bit position designating information supplied from said bit position designating circuit to designate the initial memory plane, and bit length designating information supplied from said bit length designating circuit to designate a predetermined number of sequential memory planes starting with said initial memory plane.

5. A memory device according to claim 4, in which said read/write operation is effected such that the control information stored in said bit position designating circuit and bit length designating circuit is supplied to memory plane enable circuit means to sequentially select initial and subsequent address memory planes of the bank in such a way that a predetermined number of memory planes are designated for each selection and bits representing said picture element information are shifted by a selector means in such a way that said read/write operation is started from said initial memory plane; and such that, in a write mode, the picture element information stored in data register means is written into those X and Y address positions of the selected respective memory planes which correspond to the X and Y address information stored in said address register and, in a read mode, out of bits read out from said address positions only bits through said selection means and gate circuit are extracted for supply to said data register means.

* * * * *